United States Patent [19]

Furukawa et al.

[11] 4,084,219
[45] Apr. 11, 1978

[54] DC-DC CONVERTER

[75] Inventors: Masamichi Furukawa, Yokohama; Yoshio Serikawa, Tokyo, both of Japan

[73] Assignee: Ricoh Company, Ltd., Japan

[21] Appl. No.: 780,459

[22] Filed: Mar. 23, 1977

[30] Foreign Application Priority Data

Mar. 23, 1976 Japan .................................. 51-31731

[51] Int. Cl.² .......................................... H02M 3/315
[52] U.S. Cl. ......................................... 363/21; 363/97; 331/112
[58] Field of Search .................. 321/2, 45 S; 331/112; 363/18–21, 97, 131

[56] References Cited

U.S. PATENT DOCUMENTS 3,132,309  5/1964  Constable ......................... 331/112 X
3,435,320  3/1969  Lee et al. ......................... 331/112 X
3,639,826  2/1972  Grundberg ............................. 321/2
3,702,961  11/1972  Erickson ........................... 331/112 X Primary Examiner—William M. Shoop
Attorney, Agent, or Firm—McGlew and Tuttle

[57] ABSTRACT

A DC-DC converter includes a blocking oscillator which is fed with a dc input from an input source and which oscillates to produce an output, which is rectified by a rectifier. The converter also includes an output voltage controlling transistor, the base of which is fed with the rectified output through a constant voltage element. The transistor controls a base current to an oscillating transistor which is contained in the blocking oscillator. The base current to this latter transistor is fed from the input source through a starting resistor and is also fed from the rectifier output through another resistor.

3 Claims, 3 Drawing Figures

DC-DC CONVERTER

BACKGROUND OF THE INVENTION

The invention relates to a so-called DC-DC converter which converts a dc voltage from a source such as a battery into a high dc voltage.

Such a DC-DC converter is often used in a desktop electronic calculator or the like for converting a battery voltage of the order of 3 to 6 volts to a higher voltage above 20 volts to energize fluorescent display tubes. A typical DC-DC converter of the prior art is shown in FIG. 1. As shown, it includes a blocking oscillator OSC1 which comprises an oscillating NPN transistor Q1, and NPN drive transistor Q2, a base bias resistor R1, an oscillation capacitor C1, and a drive winding L1 and a feedback winding L2 of a transformer T1. The collector of the transistor Q1 is connected with an input terminal 1 throught the drive winding L1. The emitter of the transistor Q1 is connected with a common terminal 2 while the emitter of the transistor Q2 is connected with the base of the transistor Q1. The collector of the transistor Q2 is also connected with the input terminal 1 while the base of the transistor Q2 is connected with the input terminal 1 through base bias resistor R1. The feedback winding L2 is connected, in series with the capacitor C1, between the base of the transistor Q2 and the common terminal 2. Where the oscillating transistor Q1 has a sufficiently high dc amplification, the drive transistor Q2 may be eliminated, with the base of the transistor Q1 being connected with the junction between the resistor R1 and the capacitor C1. The transformer T1 includes an output winding L3 which has its one end connected with the anode of a diode D1 and its other end connected with common terminals 2, 3 which are connected together as shown. An inductor L4 is connected between the cathode of the diode D1 and an output terminal 4. Capacitors C2 and C3 are connected between the opposite end of the inductor L4 and the common terminals 2, 3. The diode D1, inductor L4 and capacitors C2, C3 constitute together a rectifier REC. In order to stabilize the output voltage, there is provided an NPN transistor Q3, for controlling the output, voltage as well as a constant voltage diode ZD, with the collector of the transistor Q3 being connected with the base of the transistor Q2. The transistor Q3 has its emitter connected with the common terminals 2, 3 and its base connected with the anode of the constant voltage diode Zd which has its cathode connected with the output terminal 4.

In the DC-DC converter thus constructed, when a dc voltage is applied across the terminals 1, 2 from an input source E such as a battery, the transistor Q1 is rendered conductive by its base current being supplied through resistor R1 as amplified by the drive transistor Q2. A resulting current flow through the drive winding L1 induces a voltage across the feedback winking L2, which voltage is applied to the base of the transistor Q2 through the capacitor C1, thus causing an oscillation. A high voltage is induced across the output winding L3, and is rectified by the diode D1 and smoothed by a smoothing circuit formed by the inductor L4 and capacitors C2, C3, thus producing a dc voltage across the terminals 4, 3. This dc voltage is applied to the base of the transistor Q3 through the diode ZD and, when it exceeds a preset voltage, the transistor Q3 is biased into conduction to cause an attenuation of the oscillation by the circuit OSC1, thus controlling the dc voltage developed across the terminals 4, 3 to a uniform value for supply to a load RO.

With this converter, if an input voltage supplied by the source E decreases below a given value, the magnitude of a current I1 which flows through the resistor R1 decreases, reducing the collector current I2 of the transistor Q3 and increasing the base current to the transistor Q2 in order to maintain a constant output voltage. However, the output voltage cannot be maintained constant unless an arrangement is made such that a change in the current I2 is greater than a change in the current I1. A greater change in the current I2 requires a large change in the current flow through the diode Zd. This means that, as the input voltage is lowered, the current I3 through the diode ZD is substantially reduced to cause a reduction in voltage developed thereacross, thus causing a decrease in the magnitude of the output voltage.

It may appear that the resistor R1 may be connected between the base of the transistor Q2 and the output terminal, since then there occurs no change in the magnitude of the current I1 passing through the resistor R1 as the input voltage varies, and it is only necessary to allow the current I2 to vary by an amount which corresponds to a change in the base current of the transistor Q2 required for the output voltage to be maintained constant. This reduces a required change in the current I3, and hence reduces a change in the voltage developed across the diode ZD, resulting in a reduced fluctuation of the output voltage. However, when the input source E is initially turned on, there is no output voltage available to supply the base current to the transistor Q2, so that the blocking oscillator cannot be set in oscillation, and is therefore inoperable.

SUMMARY OF THE INVENTION

It is an object of the invention to provide a DC-DC converter having a blocking oscillator including an oscillating transistor in which a base current to the transistor is supplied from an input source through a starting resistor, thereby assuring the onset of oscillation by the blocking oscillator as the input source is turned on.

It is another object of the invention to provide a DC-DC converter having a blocking oscillator including an oscillating transistor in which a base current to the transistor is supplied from the output of a rectifier through a resistor, thereby enabling a fluctuation in the output voltage to be reduced.

DETAILED DESCRIPTION OF EMBODIMENTS

Figure 1:
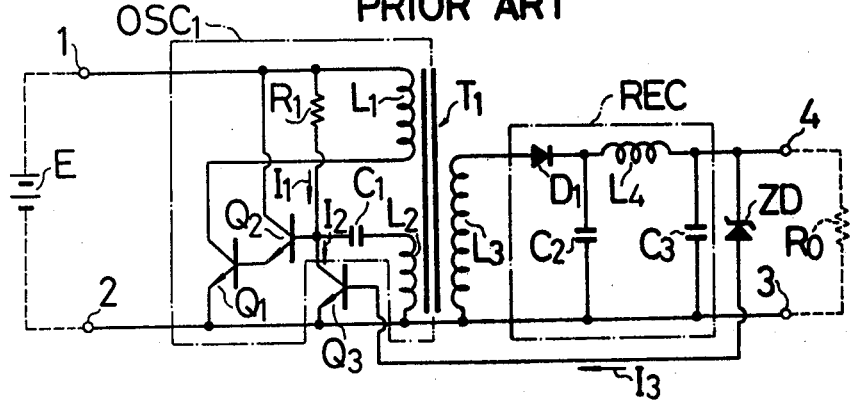
FIG. 1 is a circuit diagram of a conventional DC-DC converter.
Figure 2:
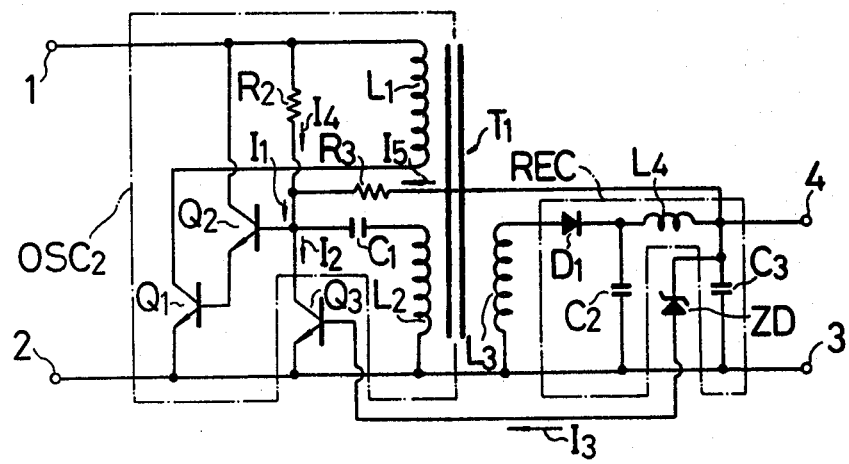
FIGS. 2 and 3 are circuit diagrams of embodiments of the invention.

Referring to FIG. 2, there is shown an embodiment of the invention which includes a blocking oscillator OSC2, which is generally similar to the blocking oscillator OSC1 shown in FIG. 1 except that a starting resistor R2 is connected between the input terminal 1 and the base of the transistor Q2 and another resistor R3 is connected between the output terminal 4 and the base of the transistor Q2. When the input source E is initially turned on, the transistor Q1 is supplied with a base current, which is supplied from the input source E through resistor R2 as amplified by the transistor Q2, whereby the blocking oscillator OSC2 starts to oscillate. During the normal operation subsequent to the starting, the base current to the transistor Q1 is principally fed from the output terminal 4 through resistor R3 as amplified by the transistor Q2. The resistance of the resistor R2 is chosen such that the starting of the blocking oscillator OSC2 is assured for a range of input voltage contemplated, and the resistance of the resistor R3 is chosen such that the oscillation of the blocking oscillator OSC2 is maintained and the output voltage can be controlled in a stable manner by the transistor Q3. Thus, during the normal operation, the current I4 which flows through the resistor R2 is less than the current I5 which flows through the resistor R3, reducing a variation of the current I1 (=I4 + I5) and hence a variation in the current I3 through the diode ZD as the input voltage varies, resulting in a reduced fluctuation of the output voltage.

Figure 3:
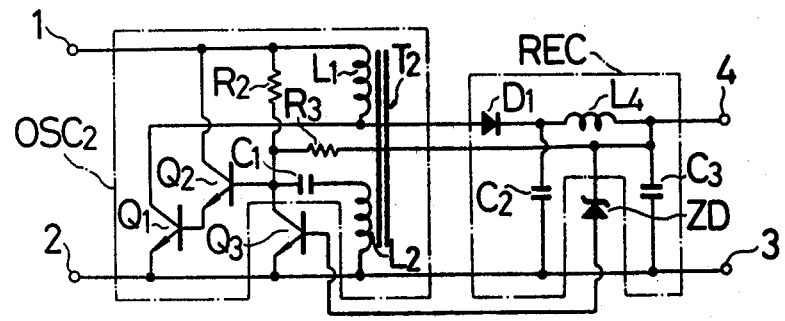

FIG. 3 shows another embodiment of the invention which is similar to the embodiment shown in FIG. 2 except a transformer T2 is used which corresponds to the transformer T1 except the output winding L3 is eliminated, with the anode of the diode D1 being connected with the collector of the transistor Q1. In this instance, the blocking oscillator OSC2 starts to oscillate even if the resistor R2 is removed when the input voltage is high, but cannot start oscillating without the resistor R2 when the input voltage is reduced, for example, below 2 volts.

What is claimed is:

1. In a DC-DC converter comprising a blocking oscillator having input terminals for connection to a dc input source, an oscillating transistor, which oscillates when it is fed with a dc input from the input source, and an ac output, a rectifier converting the ac output of the blocking oscillator into a dc output at output terminals thereof, an output voltage controlling transistor controlling a base current to the oscillating transistor to thereby control the oscillation, and a constant voltage element connected between the base of the output voltage controlling transistor and an output terminal of the rectifier; the improvement which comprises a starting resistor connected between the base of said oscillating transistor and said input source; and a base current supplying resistor connected between the base of said oscillating transistor and said output terminal of said rectifier; whereby a base current to said oscillating transistor is fed from said input source through said starting resistor, to initiate oscillation, and from said rectifier output terminal through said supplying resistor during oscillation, to maintain the output voltage constant irrespective of fluctuations in the input voltage.

2. In a DC-DC converter, the improvement claimed in claim 1, in which said blocking oscillator includes a transformer having a drive winding and a feedback winding included in said blocking oscillator, and having an output winding; said rectifier being connected across said output winding.

3. In a DC-DC converter comprising a blocking oscillator, having input terminals for connection to a dc input source, an oscillating transistor, which oscillates when it is fed with a dc input from the input source, and an ac output, a rectifier converting the ac output of the blocking oscillator into a dc output at output terminals thereof, an output voltage controlling transistor controlling a base current to the oscillating transistor to thereby control the oscillation, and a constant voltage element connected between the base of the output voltage controlling transistor and an output terminal of the rectifier; the improvement which comprises a starting resistor connected between the base of said oscillating transistor and said input source; and a base current supplying resistor connected between the base of said oscillating transistor and said output terminal of said rectifier; whereby a base current to said oscillating transistor is fed from both said input source and said rectifier through the respective said resistors; said blocking oscillator including a transformer having a drive winding and a feedback winding; said rectifier being connected between the collector of said oscillating transistor and one of said input terminals of said blocking oscillator.

* * * * *